(12) United States Patent
Hartwich et al.

(10) Patent No.: US 10,454,705 B2
(45) Date of Patent: Oct. 22, 2019

(54) DEVICE AND METHOD FOR SELECTIVELY HIDING BUS OSCILLATIONS DURING DATA RECEPTION VIA A BUS SYSTEM

(71) Applicant: Robert Bosch GmbH, Stuttgart (DE)

(72) Inventors: Florian Hartwich, Reutlingen (DE); Steffen Walker, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/772,170

(22) PCT Filed: Nov. 7, 2016

(86) PCT No.: PCT/EP2016/076778
§ 371 (c)(1),
(2) Date: Apr. 30, 2018

(87) PCT Pub. No.: WO2017/080938
PCT Pub. Date: May 18, 2017

(65) Prior Publication Data
US 2018/0324000 A1 Nov. 8, 2018

(30) Foreign Application Priority Data

Nov. 12, 2015 (DE) .................. 10 2015 222 334

(51) Int. Cl.
*G06F 13/40* (2006.01)
*H04L 12/40* (2006.01)
(Continued)

(52) U.S. Cl.
CPC .... *H04L 12/40032* (2013.01); *G06F 13/4004* (2013.01); *H04L 25/0272* (2013.01);
(Continued)

(58) Field of Classification Search
CPC .......... G06F 13/40; H04L 12/40; H04L 25/03
See application file for complete search history.

(56) References Cited

U.S. PATENT DOCUMENTS 3,668,532 A * 6/1972 Potash ................. H03K 5/1532
327/335
6,229,334 B1 * 5/2001 Kelley ................. G06F 13/4072
326/30

(Continued)

FOREIGN PATENT DOCUMENTS

DE 102009008182 A1 10/2009
JP H0758712 A 3/1995

(Continued)

OTHER PUBLICATIONS

International Search Report dated Jan. 23, 2017, of the corresponding International Application PCT/EP2016/076778 filed Nov. 11, 2016.

*Primary Examiner* — Henry Tsai
*Assistant Examiner* — Christopher Daley
(74) *Attorney, Agent, or Firm* — Norton Rose Fulbright US LLP; Gerard Messina

(57) ABSTRACT

A device and a method for selectively hiding bus oscillations upon data reception via a bus system. The device encompasses a monitoring element for monitoring a difference of the bus signal on a bus line of the bus system, and a masking element for masking oscillations of the bus signal for a predetermined masking time if the monitoring result of the monitoring element indicates that oscillations of the bus signal following a transition of the bus signal from a dominant to a recessive state exceed at least one predetermined threshold value.

10 Claims, 4 Drawing Sheets

(51) Int. Cl.
*H04L 25/02* (2006.01)
*H04L 25/03* (2006.01)

(52) U.S. Cl.
CPC .... *H04L 25/0278* (2013.01); *H04L 25/03834* (2013.01); *H04L 2012/40215* (2013.01); *H04L 2012/40273* (2013.01)

(56) References Cited

U.S. PATENT DOCUMENTS

| | | | |
|---|---|---|---|
| 6,484,223 B1* | 11/2002 | Lenz | H04L 25/03834 327/50 |
| 2003/0022650 A1* | 1/2003 | Tsuji | H04B 1/1081 455/296 |
| 2007/0092232 A1* | 4/2007 | Fujii | H02P 7/282 388/814 |
| 2009/0200973 A1* | 8/2009 | Uchiyama | H02M 1/32 318/400.26 |
| 2011/0285424 A1 | 11/2011 | Suzuki et al. | |
| 2012/0293230 A1 | 11/2012 | Mori et al. | |
| 2016/0254926 A1* | 9/2016 | Walker | H04L 12/4135 375/316 |
| 2017/0322518 A1* | 11/2017 | Iri | G04G 19/12 |

FOREIGN PATENT DOCUMENTS

| | | |
|---|---|---|
| JP | 2009225138 A | 10/2009 |
| JP | 2011010053 A | 1/2011 |
| JP | 2011244241 A | 12/2011 |
| JP | 2012257205 A | 12/2012 |
| WO | 2011128956 A1 | 10/2011 |

\* cited by examiner

DEVICE AND METHOD FOR SELECTIVELY HIDING BUS OSCILLATIONS DURING DATA RECEPTION VIA A BUS SYSTEM

FIELD

The present invention relates to a device and a method for selectively hiding bus oscillations upon data reception via a bus system in order to compensate for termination and topology implemented with increasingly low quality, from a technical point of view, of bus lines in vehicle applications.

BACKGROUND INFORMATION

The CAN bus system is used in the context of communication between sensors and control devices, for example in automobiles. In the CAN bus system, messages are transmitted by way of the CAN protocol as described in the CAN specification in ISO 11898.

In the CAN bus system, the bit rate is the same in all portions of the protocol. The maximum bit rate is 1 Mbit/s, i.e., the bit time tbit is 1 µs. In a further development of the CAN protocol, namely CAN with flexible data rate (CAN FD), in contrast to the classic CAN protocol, at the end of the arbitration phase the data rate or bit rate for the subsequent data phase is raised to, for example, 2 Mbit/s or 5 Mbit/s. This entails correspondingly shorter bit times tbit, for example tbit=200 ns for a data rate or bit rate of 5 Mbit/s. This is described more precisely in the current ISO standard 11898-1 (under development) or the specification entitled "CAN with Flexible Data Rate, Specification Version 1.0 (released Apr. 17, 2012)" constituting a CAN protocol specification with CAN FD.

According to CAN Physical Layer Standard ISO 11898-2/-5/-6, a CAN bus system is to be constructed in such a way that at least two subscriber stations or nodes, such as sensors or control devices, etc., are each connected to a bus line via a stub line. The bus line is ideally terminated with a respective terminating resistor at the two ends of the bus line. This topology ideally exhibits no transients upon a change in bus state from dominant to recessive or vice versa. According to CAN Physical Layer Standard ISO 11898-2/-5/-6, only this topology is to be used.

What is being observed nowadays, however, that in reality so-called star topologies, having only one terminating resistor, are instead being used more and more often. This is advantageous principally in the manufacture of vehicles, since it simplifies the manufacturing process and interim inspections. This topology and termination has the bad property, however, of impressing strong dynamics in the form of oscillations on the bus lines when transceiver output stages switch off, especially upon transition of the bus signal from dominant to recessive. In the worst case, the oscillations do not decay over the entire bit time tbit of a signal bit, and are then, as a result of the conditions described below, undesirably detected as oscillations at the terminal for the received signal RX of the receiving subscriber station.

The nominal bit time N is subdivided into four phases: a Sync_Seg(N) phase, a Prop_Seg(N) phase, a Phase-Seg1(N) phase, and a Phase-Seg2(N) phase. The Sync_Seg(N) phase encompasses 1/N of the nominal bit time N, the Sync_Seg(N) phase encompasses 5/N of the nominal bit time N, and the Phase-Seg1(N) phase and Phase-Seg2(N) phase each encompass 4/N of the nominal bit time N.

At the receiving subscriber station, the bit is sampled at a definable point in time within the nominal bit time N. This definable point in time is also called the "sample point." The sample point generally is programmed between Phase_Seg1 and Phase_Seg2. The corresponding new bus state is recognized only if it is present at the receiving node at the time of the sample point.

Long-lasting oscillations in bus voltage due to technically incorrect termination and topology of the bus systems are consequently a factor that, in the present-day real conditions as described above, complicate or prevent error-free data reception at the receiving subscriber station. In the context of CAN FD, a further factor that complicates or prevents error-free data reception at the receiving subscriber station is a shortening of the bit time tbit due to an increasing bit rate.

SUMMARY

An object of the present invention is therefore to furnish a device and a method for selectively hiding bus oscillations upon data reception via a bus system, which solve the problems recited above. The intention in particular is to furnish a device and a method for selectively hiding bus oscillations upon data reception via a bus system, with which the termination and topology of CAN bus lines in vehicle applications implemented with increasingly low quality, from a technical point of view, can be compensated for.

The object may be achieved by an example device in accordance with the present invention for selectively hiding bus oscillations upon data reception via a bus system, having the features of Claim 1. The device encompasses a monitoring element for monitoring a difference of the bus signal on a bus line of the bus system, and a masking element for masking oscillations of the bus signal for a predetermined masking time if the monitoring result of the monitoring element indicates that oscillations of the difference of the bus signal following a transition of the bus signal from a dominant to a recessive state exceed at least one predetermined threshold value.

With the example device, correct data reception can be implemented even in the context of a bus topology that is implemented with lower quality, from a technical point of view, than is defined in the CAN Physical Layer Standard ISO 11898-2/-5/-6. The process of manufacturing vehicles, and interim inspections during the manufacture of vehicles, are thereby simplified without degrading the transfer properties of the bus system used in the vehicle.

The device furthermore makes possible, for the user of the bus system, a longer-duration phase within the bit time for a bit (indicated in the figures as tdom for a dominant bit) for parameterizing or programming the sampling point in the context of system design.

The device also requires very little silicon area and therefore has very low manufacturing costs.

A further advantage of the device is that the device adapts itself, during the arbitration phase in accordance with the CAN protocol or CAN FD protocol, to different applications, such as bus topology and termination.

The device can also easily be added subsequently to an existing bus system.

Advantageous further embodiments of the device are described herein.

It is possible for the monitoring element to be provided for monitoring an output of a reception comparator into whose at least two inputs the difference of the bus signal is fed, and/or for the masking element to be configured to hold a received signal driver of a subscriber station in the recessive state for the predetermined masking time.

According to a variant embodiment, the dimensioning of the bit time for a dominant bit, and the masking time, can be varied depending on whether the subscriber station is acting as a receiver or as a transmitter of the bus signal.

The monitoring element can be embodied to count the number of exceedances beyond a reception threshold to negative values by a signal generated from the bus signal, as a prerequisite for switching on the masking element, and/or the monitoring element can be configured to count the number of exceedances beyond two reception thresholds or three different reception thresholds.

A first reception threshold preferably has a lower voltage value than a second reception threshold, and the masking element is configured to mask oscillations of a signal, generated from the bus signal, for a predetermined masking time if the second reception threshold is exceeded less often than the first reception threshold. Alternatively or additionally, the monitoring element can be configured to check, by way of a third reception threshold, the number of exceedances by the signal to negative values. Alternatively or additionally, the masking element can be configured to mask the digital received signal, after a bit time, for the masking time only when a change of state from dominant to recessive occurs and when the value has fallen below the third reception threshold.

The device described above can be part of a transmit/receive module for a subscriber station for a bus system.

The transmit/receive module described above can be part of a subscriber station for a bus system. The subscriber station can furthermore have a CAN controller, as well as a system ASIC for accommodating the transmit/receive module, the above-described device being connected between an output of a reception comparator of the transmit/receive module and an input of a signal driver for a received signal of the CAN controller.

The bus signal for the subscriber station is preferably constructed in accordance with the CAN protocol and/or the CAN FD protocol and/or the TTCAN protocol.

The device described above can also be part of a bus system that has a bus line and at least two subscriber stations that are interconnected by way of the bus line for communication. At least one of the subscriber stations can have the above-described device.

The object described above can furthermore be achieved by way of an example method for selectively hiding bus oscillations upon data reception via a bus system, in accordance with the present invention. The method encompasses the steps of: monitoring, with a monitoring element, a difference of the bus signal on a bus line of the bus system; and masking, with a masking element, oscillations of the bus signal for a predetermined masking time if the monitoring result of the monitoring element indicates that oscillations of the bus signal after a transition of the bus signal from a dominant to a recessive state exceed at least one predetermined threshold value.

The example method achieves the same advantages as those described earlier with reference to the example device.

Further possible implementations of the present invention also encompass combinations, not explicitly recited, of features or embodiments described above or hereinafter with reference to the exemplifying embodiments. One skilled in the art will also add individual aspects to the respective basic form of the present invention as improvements or supplements.

BRIEF DESCRIPTION OF THE DRAWINGS

The present invention is described in further detail below on the basis of exemplifying embodiments and with reference to the figures.

DETAILED DESCRIPTION OF EXAMPLE EMBODIMENTS

Figure 1:
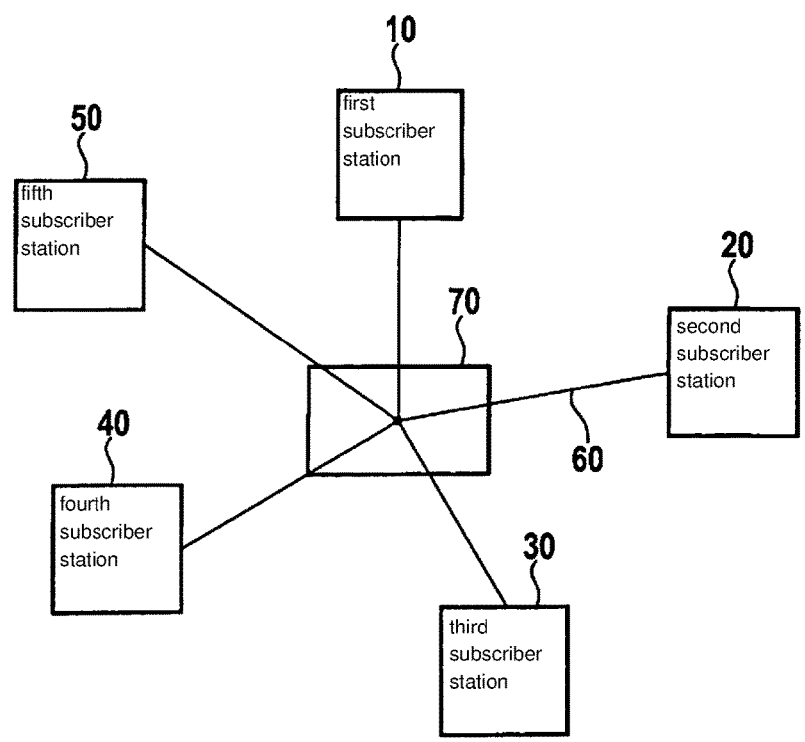
FIG. 1 is a simplified block diagram of a bus system in accordance with a first exemplifying embodiment.

In the figures, identical or functionally identical elements are labeled with the same reference characters unless otherwise indicated.

FIG. 1 shows a bus system 1 that can be utilized in a vehicle, in particular in a motor vehicle, an aircraft, etc., or in a hospital, etc.

Bus system 1 in FIG. 1 has a first subscriber station 10, a second subscriber station 20, a third subscriber station 30, a fourth subscriber station 40, a fifth subscriber station 50, a bus line 60, and a terminating resistor 70.

Bus system 1 can be, for example, a CAN bus system or a CAN FD bus system, etc. In the present exemplifying embodiment, bus system 1 is configured very generally for a communication in which one of subscriber stations 10 to 50 is at least temporarily guaranteed exclusive, collision-free access to bus line 60.

First subscriber station 10 can be, for example, a control device of a motor vehicle. Second, fourth, and fifth subscriber stations 20, 40, 50 can respectively be, for example, a sensor of the motor vehicle. Third subscriber station 30 can be, for example, an indicating device of a motor vehicle.

Figure 2:
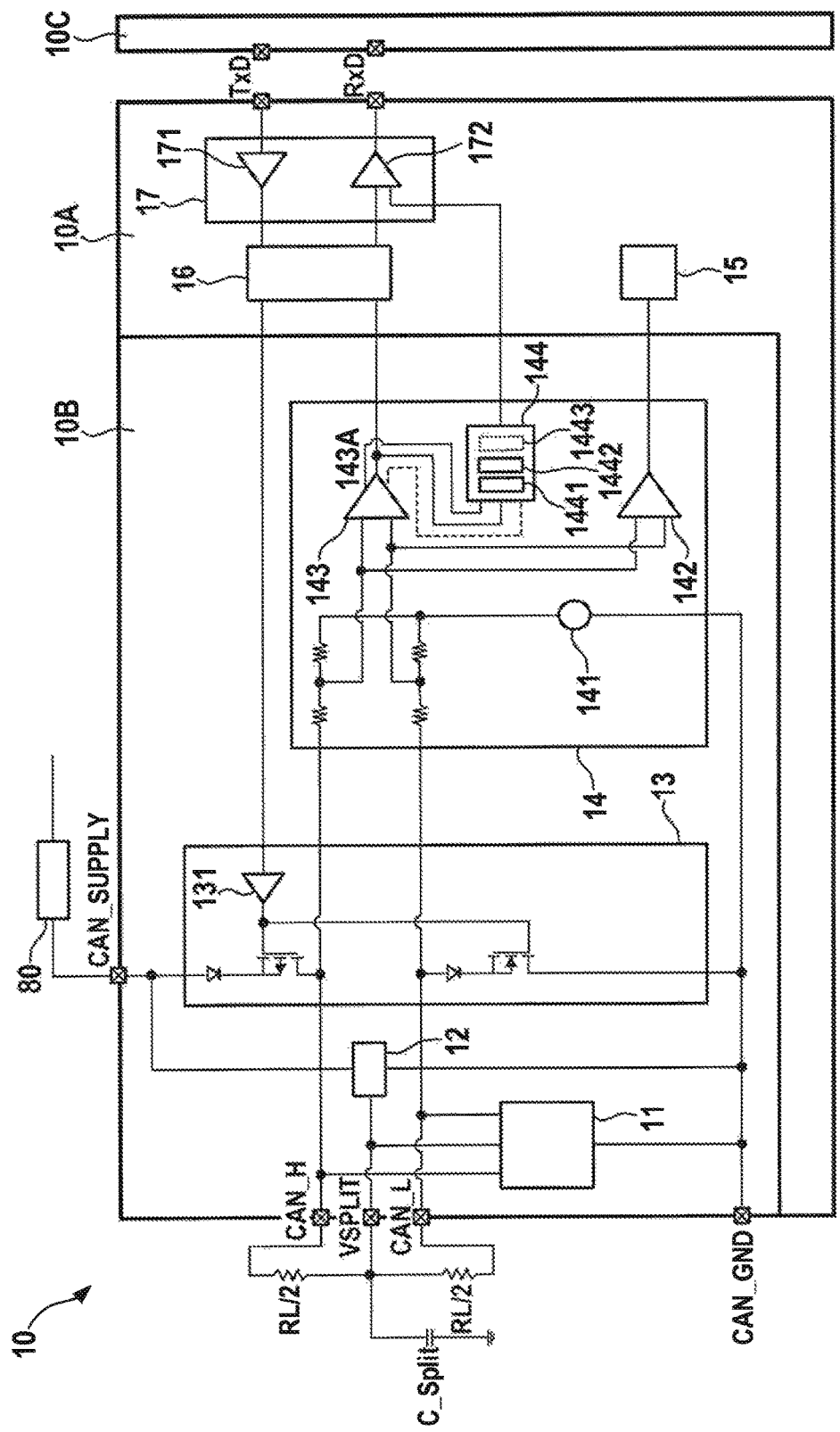
FIG. 2 is a simplified block diagram of a subscriber station in the bus system of FIG. 1.

FIG. 2 shows the construction of subscriber station 10 in more detail with reference to its CAN module. The CAN modules of the other subscriber stations 20 to 50 are each constructed in the same manner as the CAN module of subscriber station 10.

Subscriber station 10 is constructed in large part in the same manner as a conventional subscriber station having a CAN module. The only parts of subscriber station 10 described below are therefore those which differ from the conventional subscriber station having a CAN module, or are to be recited for the description of the present invention.

The CAN module of subscriber station 10 has a system ASIC 10A and an integrated transmit/receive module 10B that is connected via system ASIC 10A to a CAN controller 10C. Digital terminals TxD and RxD are provided on system ASIC 10A for a transmitted signal TxD from CAN controller 10C and a received signal RxD for CAN controller 10C.

CAN_H, CAN_L terminals, which are connected to one another via resistors RL/2 outside the CAN module, are provided on transmit/receive module 10B for connection to bus line 60. The connection of the two resistors RL/2 can be connected on the one hand via a capacitor C to ground, and on the other hand to a terminal VSPLIT. Transmit/receive module 10B is connected to ground at a terminal CAN_GND. Transmit/receive module 10B furthermore has a terminal CAN_SUPPLY by way of which a supply voltage for transmit/receive module 10B, having a value of 5V, can be fed in via a filter 80.

Transmit/receive module 10B of subscriber station 10 furthermore has an ESD protection unit 11, an optionally usable or optionally present VSPLIT unit 12, a transmitting unit 13, a receiving unit 14, a wake-up unit 15 that can also be referred to as a wake-up logic unit, a digital unit 16, and an input/output unit 17. Transmitting unit 13 has, in addition to a circuit (not further labeled) made up of MOSFETs and diodes, a TxD driver or transmitted signal driver 131. Receiving unit 14 has, in addition to a circuit (not further labeled) made up of resistors, a bus preload device 141, a wake-up pulse receiver 142 for receiving wake-up pulses, a reception comparator 143, and a device 144. An input/output unit 17 has a TX driver 171 and an RxD driver or received signal driver 172.

Device 144 has a monitoring element 1441 and a masking element 1442. Device 144 can optionally also have a filter 1443. Monitoring element 1441 can be embodied as a logic unit having three reception thresholds RTH1, RTH2, and RTH3, as shown and explained with reference to FIG. 8.

Figure 3:
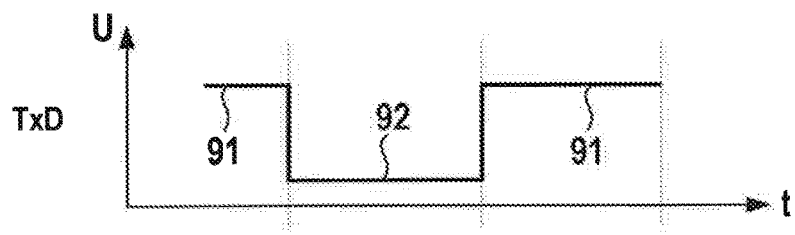
FIG. 3 shows an example of part of a transmitted signal TX of a subscriber station of the bus system of FIG. 1.

FIG. 3 shows a digital transmitted signal TxD that is inputted from CAN controller 10C to transmitting unit 13 at terminal TxD, so that the transmitted signal TxD is transmitted by way of transmitting unit 13 to terminals CAN_H and CAN_L onto bus line 60.

Figure 4:
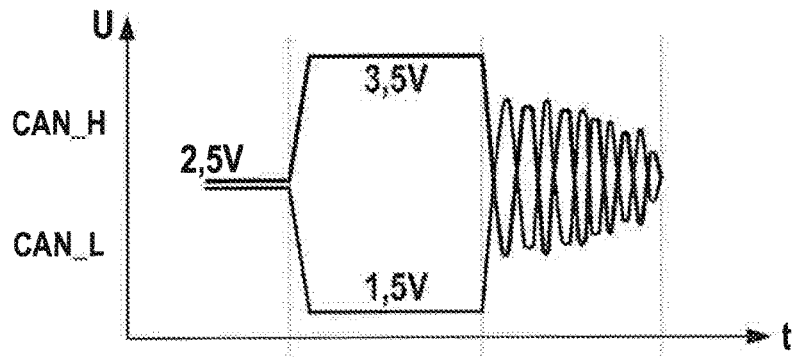
FIG. 4 shows bus signals CAN_H and CAN_L that are the consequence of the transmitted signal TX of FIG. 3.

FIG. 4 shows the signals CAN_H and CAN_L, resulting from the digital transmitted signal TxD, on bus line 60.

Figure 5:
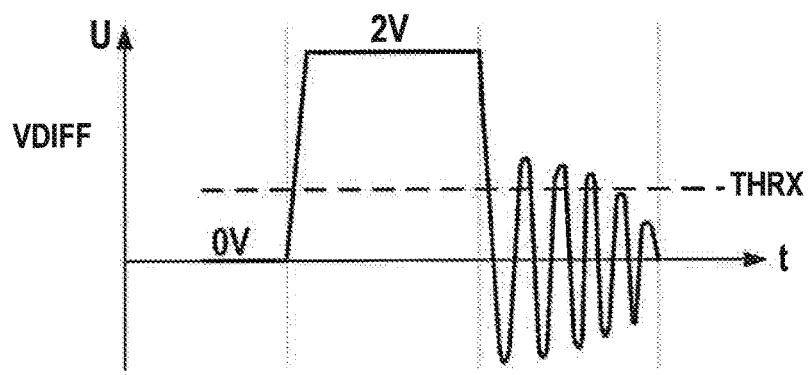
FIG. 5 shows an analog signal of the difference voltage $V_{DIFF}$ that occurs between the two bus lines CAN_H and CAN_L as a result of the transmitted signal TX of FIG. 3.
Figure 6:
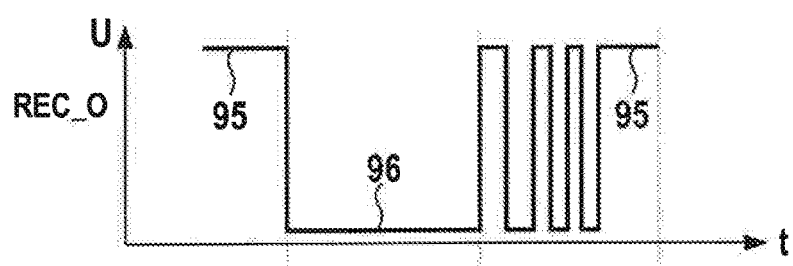
FIG. 6 shows a receiver output signal REC_O that occurs at the subscriber station as a result of the transmitted signal TX of FIG. 3.

The signal of terminal CAN_H is furthermore present at a first input of reception comparator 143. The signal of terminal CAN_L is furthermore present at a second input of reception comparator 143. The signals arriving from CAN bus line 60, divided down in terms of their amplitude, are consequently present at the input side of input comparator 143. A difference voltage VDIFF shown in FIG. 5 is present in divided-down form between the inputs of reception comparator 143. The receiver output signal REC_O as shown in FIG. 6 is outputted at the output of receiver 143 and is inputted via as many as three inputs into device 144. Received signal driver 172 forms, from the output of device 144, the digital received signal RxD1 shown in FIG. 7.

Figure 7:
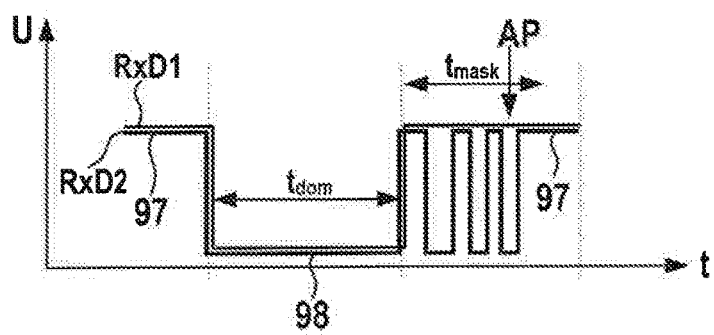
FIG. 7 is a superimposed depiction of the received signal RxD1 of a subscriber station having a device in accordance with the first exemplifying embodiment and the received signal RxD2 of a conventional subscriber station, in the bus system in accordance with the first exemplifying embodiment.

As is evident from FIGS. 3 to 7 in combination, in subscriber station 10, transmitting unit 13 converts the levels 91, 92, shown in FIG. 3, which arrive at the TxD terminal into dominant and recessive states on CAN bus line 60, as shown in FIG. 4. Receiving unit 14 detects the dominant and recessive bus states with the aid of a reception threshold THRX on difference voltage VDIFF, as shown in FIG. 5, as a receiver output signal REC_O according to FIG. 6. The detected bus states are outputted at the RxD terminal as levels 97, 98, as shown in FIG. 7. The dominant level 98 denotes the time tdom; the recessive level 97 that follows the dominant level 98 is held for the time tmask, as will be described in further detail below.

VDIFF is the analog difference voltage between the two bus lines CAN_H and CAN_L, where VDIFF=CAN_H− CAN_L. Difference voltage VDIFF is equal to 0 V for a recessive bit, and typically to 2 V for a dominant bit.

When subscriber station 10 is in operation, the bus voltages divided down by resistors RL/2 are present at the input of reception comparator 143 (FIG. 2). Reception comparator 143 converts the difference between these divided-down voltages into a receiver output signal REC_O that, via device 144 and by way of received signal driver 172 (FIG. 2), is driven to the RxD terminal for CAN controller 10C of subscriber station 10, as shown in FIG. 2.

Conventionally in a CAN transceiver, only one switching threshold or reception threshold RTH1 is implemented in order to differentiate between dominant and recessive bus states. For this, one output of reception comparator 143 is sufficient to indicate the result of the two threshold considerations: reception comparator 143 compares the divided-down difference voltage VDIFF with the reception threshold RTH1.

Because two further reception thresholds RTH2 and RTH3 are now used in order to implement the invention, so as to detect the amplitude of oscillations of the difference voltage VDIFF, reception comparator 143 has three outputs in order to indicate the result of the threshold considerations.

The up to three outputs of reception comparator 143 are made available as inputs of device 144.

During normal operation of subscriber station 10, device 144 monitors, with its monitoring element 1441 (FIG. 8), the up to three outputs 143A (FIG. 2) of reception comparator 143. If monitoring identifies a dominant bus state 96 (FIG. 6) after a recessive state 95 (FIG. 6) for at least one time of a dominant state or bit time tdom (FIG. 7), as shown in FIGS. 6 and 7, then with the next change of state on bus line 60, i.e. from dominant to recessive, received signal driver 172 can be held at recessive for a time tmask that is illustrated in FIG. 7. What is achieved thereby is that the oscillations in the difference voltage VDIFF (FIG. 5) which are typical of high bit rates and poor termination do not influence recognition of the recessive state at the time of a sampling point AP depicted in FIG. 7. The times tdom and tmask according to FIG. 7 are relative to the bit rate of the transmitted and transferred signal, and to the bus topology.

In order to produce immunity to very short interference pulses, the detection of the triggering edge, i.e. the transition from the dominant state 96 to the recessive state 95 in FIG. 6, can be filtered using filter 1443 of FIG. 2.

Robust oscillation detection is obtained by way of a measure that is explained in further detail with reference to FIG. 8.

Figure 8:
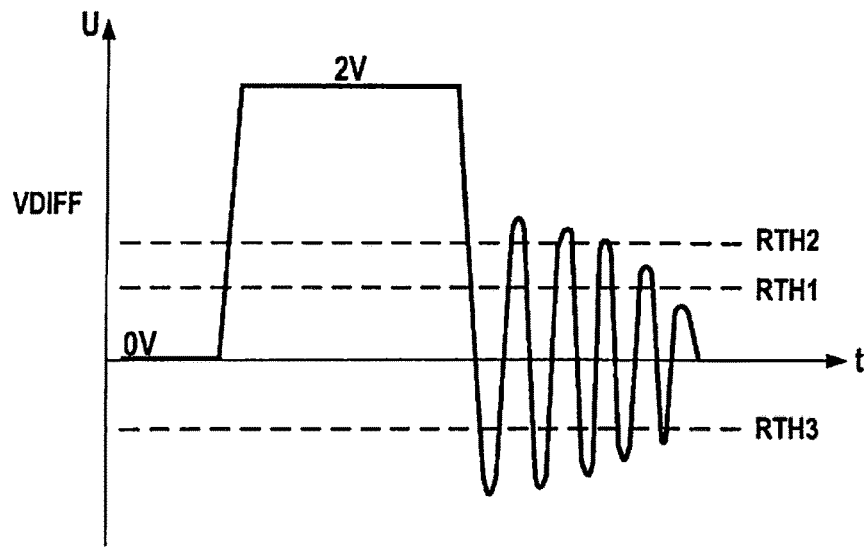
FIG. 8 shows a difference signal VDIFF that results from the transmitted signal TX of FIG. 3, in which additional reception thresholds are illustrated.

As shown in FIG. 8, in device 144 a further reception threshold RTH2 is introduced in addition to the typical reception threshold RTH1. Yet another reception threshold RTH3, which checks for negative values of VDIFF, is also provided.

Monitoring element 1441, fed from the output of reception comparator 143, counts the number of exceedances beyond the three reception thresholds RTH1, RTH2, and RTH3. For typical oscillations due to poor termination, the reception threshold RTH2 yields fewer exceedances than the reception threshold RTH1.

The further reception threshold RTH3, which checks for negative values of VDIFF, can be used, additionally or alone, as a precondition for activating masking element 1442. Accordingly, as shown in FIG. 7, after a bit time tdom the digital received signal RxD is masked for the time tmask only if a change of state (edge) occurs, and if the value has fallen below the reception threshold RTH3.

Because this kind of oscillation recognition occurs during the bit that is already present, these mechanisms can be activated during arbitration, which is carried out at a lower bit rate.

Once the mechanisms take effect, masking occurs for the present data phase of received signal driver 172 of FIG. 2, as described above, for the time tmask.

The dimensioning of the times tdom and tmask can be varied depending on whether subscriber station 10 is a transmitter or a receiver. The dimensioning of the bit time tdom for a dominant bit, and the masking time tmask, are advantageously varied depending on whether subscriber station 10 is acting as a receiver or as a transmitter of the bus signal CAN_H, CAN_L. This has the advantage that, depending on the bus topology, individual nodes or subscriber stations 10, 20, 30 in which larger oscillations are to be expected can be parameterized differently in terms of masking properties.

As described above, device 144 (FIGS. 2 and 8) therefore observes the output of reception comparator 143 (FIG. 2). If a dominant level of the received signal RxD is present at the output for a bit time (FIG. 7), every subsequent change of state toward recessive is then used to hold the downstream received signal driver 172 (FIG. 2) at recessive for the predetermined time tmask (FIG. 7).

Changes of state occurring as a result of bus oscillations can thus be suppressed by way of device 144.

Figure 9:
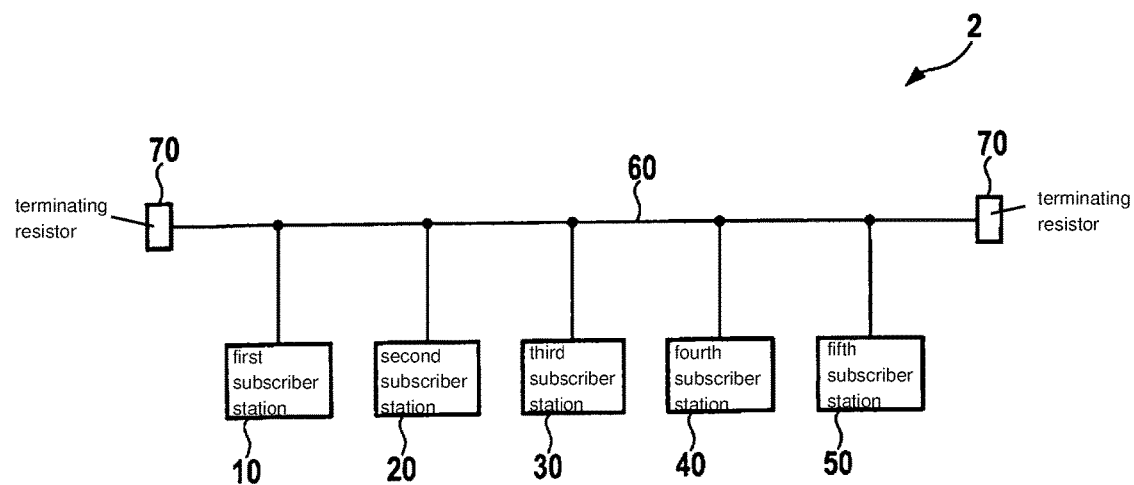
FIG. 9 is a simplified block diagram of a bus system in accordance with a second exemplifying embodiment.

FIG. 9 shows a bus system 2 according to a second exemplifying embodiment. Bus system 2 according to the second exemplifying embodiment is constructed in large part in the same manner as described with reference to bus system 1 according to the first exemplifying embodiment.

In contrast to bus system 1 according to the first exemplifying embodiment, however, bus system 2 according to the second exemplifying embodiment has two terminating resistors 70 that are provided respectively at the ends of bus line 60. Bus system 2 thus forms a bus topology in accordance with the CAN specification as described in ISO 11898. A bus topology of this kind can also be referred to as an "ISO bus topology."

With bus system 2 as well, subscriber stations 10 to 50 are constructed in the same manner as described with reference to the preceding exemplifying embodiment and as illustrated in FIG. 2.

Because of the ISO bus topology of bus system 2, subscriber stations 10 to 50 recognize in the arbitration phase that no oscillations occur upon a change in the state of the transmitted signal TX from dominant to recessive, as described in FIG. 4 with reference to the preceding exemplifying embodiment. Device 144 can therefore reduce the masking time tmask down to a value of zero in order to hold received signal driver 172 in the recessive state for a specific time. This means that no changes of state occurring as a result of bus oscillations need to be suppressed. Device 144 thus adapts during the arbitration phase to various applications, such as bus topology and termination using terminating resistors 70.

All the above-described configurations of bus systems 1, 2, of subscriber stations 10 to 50, of bus line 60, and of the method can be utilized individually or in all possible combinations. In particular, all features of the exemplifying embodiments described above can be combined in any way or even omitted. In addition, the modifications below are particularly conceivable.

Bus system 1, 2 having bus line 60 in accordance with the exemplifying embodiments is described with reference to a bus system based on the CAN protocol. The bus system in accordance with the exemplifying embodiments can also, however, be any other kind of communication network. It is advantageous, but not an obligatory prerequisite, that in the context of communication system 1 and for the first bus system, exclusive, collision-free access by a subscriber station 10 to 50 to a shared channel is guaranteed at least for specific time spans.

The number of subscriber stations 10 to 50 is arbitrarily selectable. Only two subscriber stations of subscriber stations 10 to 50 can also be present. Only subscriber stations 10 or subscriber stations 20 or subscriber stations 30, etc. can also be present in bus system 1, 2.

Device 144 does not need to be part of the CAN module of one of subscriber stations 10 to 50. Device 144 can also be furnished as a separate device externally to the CAN module of one of subscriber stations 10 to 50. This is advantageous in particular for retrofitting an existing CAN bus system 1, 2.

What is claimed is:

1. A device for selectively hiding bus oscillations upon data reception via a bus system, comprising:
   a monitoring element for monitoring a difference of the bus signal on a bus line of the bus system; and
   a masking element for masking oscillations of the bus signal for a predetermined masking time if the monitoring result of the monitoring element indicates that oscillations of a difference of the bus signal following a transition of the bus signal from a dominant to a recessive state exceed at least two predetermined threshold values, wherein each of the at least two threshold values is a non-zero threshold value, and wherein the monitoring result corresponds to comparisons of an absolute value of at least two amplitudes of the oscillations to respective absolute values of the at least two predetermined threshold values.

2. The device as recited in claim 1, wherein at least one of:
   the monitoring element monitors an output of a reception comparator into whose at least two inputs the difference of the bus signal is fed; and
   the masking element is configured to hold a received signal driver of a subscriber station in the recessive state for the predetermined masking time.

3. The device as recited in claim 2, the dimensioning of the bit time for a dominant bit, and the masking time, varying depending on whether the subscriber station is acting as a receiver or as a transmitter of the bus signal.

4. The device as recited in claim 1, wherein at least one of:
   the monitoring element is embodied to count the number of exceedances beyond a reception threshold to negative values by a signal generated from the bus signal, as a prerequisite for switching on the masking element; and
   the monitoring element is configured to count the number of exceedances beyond one of two reception thresholds or three different reception thresholds.

5. A device for selectively hiding bus oscillations upon data reception via a bus system, comprising:
   a monitoring element for monitoring a difference of the bus signal on a bus line of the bus system; and
   a masking element for masking oscillations of the bus signal for a predetermined masking time if the monitoring result of the monitoring element indicates that oscillations of a difference of the bus signal following a transition of the bus signal from a dominant to a recessive state exceed at least one predetermined threshold value, wherein at least one of:

the monitoring element is embodied to count the number of exceedances beyond a reception threshold to negative values by a signal generated from the bus signal, as a prerequisite for switching on the masking element and the monitoring element is configured to count the number of exceedances beyond one of two reception thresholds or three different reception thresholds, and wherein at least one of:

a first one of the reception thresholds has a lower voltage value than a second one of the reception thresholds, and the masking element is configured to mask oscillations of a signal, generated from the bus signal for a predetermined masking time if the second one of the reception thresholds is exceeded less often than the first one of the reception thresholds;

the monitoring element is configured to check, by way of a third one of the reception thresholds, the number of exceedances by the signal to negative values; and the masking element is configured to mask a digital received signal, after a bit time, for the masking time only when a change of state from dominant to recessive occurs and when the value has fallen below the third reception one of the reception threshold.

6. A transmit/receive module for a subscriber station for a bus system, the transmit/receive module having a device for selectively hiding bus oscillations upon data reception via a bus system, the device comprising:

a monitoring element for monitoring a difference of the bus signal on a bus line of the bus system; and a masking element for masking oscillations of the bus signal for a predetermined masking time if the monitoring result of the monitoring element indicates that oscillations of a difference of the bus signal following a transition of the bus signal from a dominant to a recessive state exceed at least two predetermined threshold values, wherein each of the at least two threshold values is a non-zero threshold value, and wherein the monitoring result corresponds to comparisons of an absolute value of at least two amplitudes of the oscillations to respective absolute values of the at least two predetermined threshold values.

7. A subscriber station for a bus system, comprising:
a CAN controller;
a transmit/receive module for a bus system, the transmit/receive module having a device for selectively hiding bus oscillations upon data reception via the bus system, the device including a monitoring element for monitoring a difference of the bus signal on a bus line of the bus system, and a masking element for masking oscillations of the bus signal for a predetermined masking time if the monitoring result of the monitoring element indicates that oscillations of a difference of the bus signal following a transition of the bus signal from a dominant to a recessive state exceed at least one predetermined threshold value; and a system ASIC (for accommodating the transmit/receive module'
wherein the device is connected between an output of a reception comparator of the transmit/receive module and an input of a signal driver for a received signal of the CAN controller.

8. The subscriber station as recited in claim 7, wherein the bus signal is constructed in accordance with at least one of the CAN protocol, the CAN FD protocol, and the TTCAN protocol.

9. A bus system, comprising:
a bus line; and
at least two subscriber stations that are interconnected by way of the bus line for communication;
wherein at least one of the subscriber stations includes a device for selectively hiding bus oscillations upon data reception via the bus system, the device including a monitoring element for monitoring a difference of the bus signal on the bus line of the bus system, and a masking element for masking oscillations of the bus signal for a predetermined masking time if the monitoring result of the monitoring element indicates that oscillations of a difference of the bus signal following a transition of the bus signal from a dominant to a recessive state exceed at least two predetermined threshold values, wherein each of the at least two threshold values is a non-zero threshold value, and wherein the monitoring result corresponds to comparisons of an absolute value of at least two amplitudes of the oscillations to respective absolute values of the at least two predetermined threshold values.

10. A method for selectively hiding bus oscillations upon data reception via a bus system, comprising:
monitoring, with a monitoring element, a difference of a bus signal on a bus line of the bus system; and
masking, with a masking element, oscillations of the bus signal for a predetermined masking time in response to the monitoring result of the monitoring element indicating that oscillations of the bus signal after a transition of the bus signal from a dominant to a recessive state exceed at least two predetermined threshold values, wherein each of the at least two threshold values is a non-zero threshold value, and wherein the monitoring result corresponds to comparisons of an absolute value of at least two amplitudes of the oscillations to respective absolute values of the at least two predetermined threshold values.

* * * * *